Patented Jan. 21, 1941

2,229,099

UNITED STATES PATENT OFFICE 2,229,099

AMINO-ALKOXY-1.4-BENZOQUINONES AND THEIR DERIVATIVES AND A PROCESS OF PREPARING THEM

Gerhard Langbein, Hofheim in Taunus, Germany, assignor to General Aniline & Film Corporation, a corporation of Delaware No Drawing. Application November 29, 1938, Serial No. 242,918. In Germany December 4, 1937

10 Claims. (Cl. 260—315)

The present invention relates to amino-alkoxy-1.4-benzoquinones and their derivatives and a process of preparing them.

I have found that amino-alkoxy-1.4-benzoquinones and their derivatives are obtainable by condensing one mol of a benzoquinone compound of the general formula:

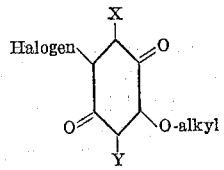

wherein X and Y represent members of the group consisting of hydrogen, halogen and methyl, with one mol of ammonia or one mol of a primary amine. The condensation is preferably carried out in the presence of an inert diluent or solvent and advantageously in the presence of one equivalent of an acid binding agent. For the sake of a good yield it is of advantage to raise the reaction temperature not too high, i. e. not above about 60° C.

The benzoquinone initial compounds are obtainable by heating 1.4-benzoquinones containing more than one halogen atom with an alcohol in the presence of a diluent, which may be the same alcohol, and in the presence of an acid binding agent in a quantity of not more than 1 equivalent calculated upon the amount of the quinone used, which is the process of my copending application Serial No. 242,917 for "Esters of mono-oxy-halogen-1.4-benzoquinones and a process of preparing them," filed on the same day as this application.

The primary amines used for the condensation may be of various kinds. There may be used alkylamines, for instance, methyl-, ethyl-, butyl-amines and others or any arylamines, which may contain in the aryl nucleus any substituents, for instance, hydroxyl, carboxyl, sulfo, alkyl, amino, acylamino and so on.

As acid binding agents there may be used salts, for instance, of acetic acid or carbonic acid, but also organic bases.

The reaction may also be effected by using as acid binding agent the amine used in the reaction, i. e. by reaction of one mol of the benzoquinone compound with 2 mols of amine in the presence of a diluent. The products thus obtained may subsequently be sulfonated.

It is, in this process, not necessary to use the ethers in an isolated form, for they may also be applied in the form of their alcoholic solutions as obtained, for instance, by the process of my above-mentioned copending U. S. patent application. The reaction is illustrated by the following scheme:

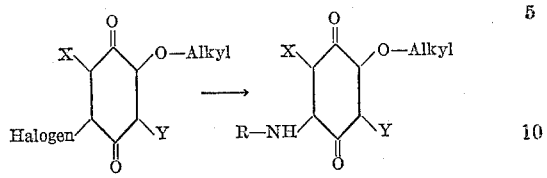

wherein X and Y represent a member of the group consisting of hydrogen, halogen, alkyl or aryl, and R represents a member of the group consisting of hydrogen, alkyl or aryl, which radicals may contain any substituents.

The new compounds dissolve in alcohol in general to a red-violet or violet to blue solution and for the most part crystallize in the form of dark violet needles or leaflets. They are valuable intermediate products for the manufacture of dyestuffs. (Cf. the co-pending U. S. patent applications Serial No. 242,919 filed Nov. 28, 1938, in the name of Gerhard Langbein for "Diamino-1:4-benzoquinones and derivatives thereof and a process of preparing them" and Serial No. 242,920 filed Nov. 29, 1938, in the name of Heinrich Greune and Gerhard Langbein for "Dioxazine dyestuffs and a process of preparing them".)

The process has the technical advantage that the easily accessible commercial chloranil can be used as parent material and that there need not be used, in the reaction, any excess of the benzoquinone derivative, such as is the case in the reaction between an amine and 1.4-benzoquinone. That the present process is practicable was surprising, since it was to be expected that the ether group, like the halogen, would be split off and quantitatively participate in the reaction with the amine or the ammonia.

The following examples serve to illustrate the invention, but they are not intended to limit it thereto; the parts are by weight:

1. 24.2 parts of 2-methoxy-3.5.6-trichloro-1.4-benzoquinone are stirred, at 40° C., into 300 parts of methanol. At this temperature, 27.2 parts of ammonia of 25 per cent strength are run into the mixture in the course of 15 minutes. The mixture is further stirred for half an hour at 40° C., then cooled and filtered with suction. The solid residue contains diamino-dichloro-benzoquinone. By concentrating the red-violet filtrate, the 5-amino-2-methoxy-3.6-dichloro-1.4-benzoquinone is obtained in the form of dark microscopic needles.

A similar product is obtained by using, instead of ammonia, an alcoholic ethylamine or methylamine solution.

2. 24.2 parts of 2-methoxy-3.5.6-trichloro-1.4-benzoquinone are stirred into 400 parts of alcohol. At a temperature of 40° C. to 45° C., a solution of 16.9 parts of para-amino-diphenyl in 100 parts of alcohol is introduced, drop by drop, in the course of 15 minutes, and a solution of 8.2 parts of sodium acetate in 20 parts of water is then slowly run in within further 15 minutes. The whole is stirred for one hour at 40° C. to 45° C. and then for another hour while cooling with ice; the product is filtered with suction, washed with alcohol and dried. In order to eliminate the small amount of the diamino-derivative formed as a by-product, the product obtained is recrystallized from alcohol, the diamino-derivative remaining undissolved. The 5-(para - diphenylamino) - 2 - methoxy - 3.6 - dichloro-1.4-benzoquinone of the following constitution:

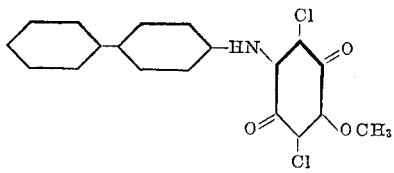

is obtained in the form of dark-violet leaflets melting at 190° C. to 192° C.

If there is used, instead of para-amino-diphenyl, a solution of 14.3 parts of beta-naphthylamine in 200 parts of alcohol, the 5-(beta-naphthylamino)-2 - methoxy - 3.6-dichloro-1.4-benzoquinone is obtained; it crystallized from alcohol in the form of dark-violet leaflets melting at 164° C. to 166° C.

3. 22.1 parts of methoxy-dichloro-toluquinone (obtainable by the process of Example 3 of application Serial No. 242,917) are stirred into 400 parts of alcohol; 9.3 parts of aniline are introduced, drop by drop, in the course of 15 minutes and, in the course of further 15 minutes, a solution of 9.8 parts of potassium acetate in 20 parts of water is run in, drop by drop. The whole is further stirred for one hour at 40° C. and then for another hour while cooling with ice, the product is filtered with suction, washed with alcohol and dried. By recrystallizing it from alcohol, the anilidomethoxy-chloro-toluquinone is obtained in the form of dark-violet leaflets melting at 170° C. to 174° C.

4. 42.4 parts of bromanil are heated to boiling, for 10 minutes, in 600 parts of alcohol, 6.9 parts of potassium carbonate being added, and the solution is then filtered with suction. 10 parts of aniline are then introduced into the filtrate, drop by drop, while stirring, at a temperature of 40° C. to 45° C. The mixture is further stirred, for half an hour, first at 40° C. and subsequently while cooling with ice; it is then filtered with suction, the solid matter is washed with alcohol and dried. In order to eliminate the small amount of dianilido-dibromo-benzoquinone formed as a by-product, the whole is recrystallized from alcohol. The 5-anilido-2-ethoxy-3.6-dibromo-1.4-benzoquinone is thus obtained in the form of shining, dark-violet needles melting at 198° C. to 199° C.

5. 24.6 parts of chloranil, 500 parts of n-butanol and 8.5 parts of sodium acetate are heated to boiling, while stirring. The mixture is then cooled and filtered with suction. A solution of 21 parts of 3-amino-N-ethylcarbazole in 100 parts of butanol is then introduced, drop by drop, at room temperature into the filtrate. The whole is stirred for one hour at 40° C., cooled, filtered with suction, washed with alcohol and dried.

The 5-(N-ethyl-carbazolyl-3'-amino) - 2 - butoxy-3.6-dichloro-1.4-benzoquinone of the following constitution:

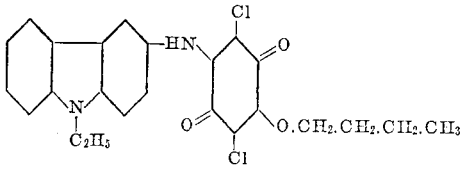

which is obtained in the form of small black-blue needles melting at 185° C. to 186° C., may be purified by recrystallizing it from alcohol or butanol.

6. An exactly neutralized solution of 17.3 parts of sulfanilic acid in 50 parts of water and 5.3 parts of calcined sodium carbonate is introduced, drop by drop, while stirring, in the course of 15 minutes, into a solution of 24.2 parts of 2-methoxy-3.5.6-trichloro-1.4-benzoquinone in 400 parts of alcohol, at a temperature of 40° C. A solution of 8.2 parts of sodium acetate in 20 parts of water is then run in, drop by drop, the whole is stirred, for one hour, at a temperature of 40° C. to 45° C., cooled, filtered with suction and the solid matter washed with alcohol.

The crude product thus obtained is dissolved in hot water, the dianilido derivative formed as a by-product is salted out by addition of some sodium chloride solution and is removed by filtering with suction. After cooling or adding a further amount of sodium chloride solution to the red-violet filtrate, the 5-(4'-sulfo-anilido)-2-methoxy-3.6-dichloro-1.4-benzoquinone crystallizes in the form of small dark-violet needles; these are filtered with suction and dried.

7. Into a suspension of 24.2 parts of 2-methoxy-3.5.6-trichlorobenzoquinone in 500 parts of alcohol there is introduced drop by drop, while well stirring, in the course of 15 minutes at room temperature a solution, prepared from 15.3 parts of 5-aminosalicylic acid (5-amino-2-hydroxy-benzoic acid), 50 parts of water and 50 parts of alcohol, and neutralized by means of sodium carbonate. The whole is stirred for some time and within further 15 minutes a solution of 8.2 parts of sodium acetate in 20 parts of water is added drop by drop. After stirring for half-an-hour, the di - (salicylamino) - dichlorobenzoquinone, which has been formed as a by-product, is eliminated from the product by filtering with suction and the 5-salicylamino-2-methoxy-dichloro-benzoquinone is precipitated from the filtrate by acidification with hydrochloric acid. It is filtered with suction, washed with water until neutral and dried. It has the following constitution:

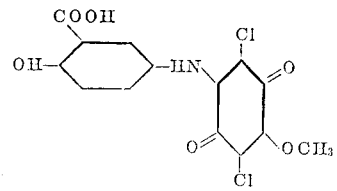

The product which forms a brown-violet powder may be recrystallized from alcohol and is then obtained in the form of violet needles melting at 254° C. to 256° C. By treating this condensation product with fuming sulfuric acid a sulfonic acid is obtained which dyes the chrome-mordanted fiber from a brown solution intense currant tints.

I claim:

1. The process which comprises reacting one mol of a benzoquinone compound of the general formula

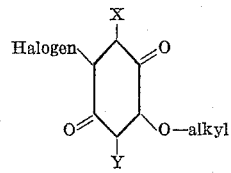

wherein X and Y represent members of the group consisting of hydrogen, halogen and methyl, with one mol of a compound of the group consisting of ammonia and primary amines in the presence of an inert diluent and of one equivalent of an acid binding agent.

2. The process which comprises reacting one mol of a benzoquinone compound of the general formula

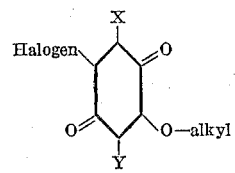

wherein X and Y represent members of the group consisting of hydrogen, halogen and methyl, with one mol of a primary amine in the presence of an inert diluent and of one equivalent of an acid binding agent.

3. The process which comprises reacting one mol of a benzoquinone compound of the general formula

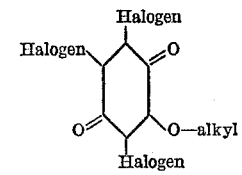

with one mol of a primary amine in the presence of an inert diluent and of one equivalent of an acid binding agent.

4. The process which comprises heating at a temperature of about 40° C. to about 45° C. one mol of 2-methoxy-3.5.6-trichloro-1.4-benzoquinone with one mol of para-amino-diphenyl in the presence of alcohol and of one equivalent of sodium acetate solution.

5. The process which comprises heating at a temperature of about 40° C. one mol of 2-butoxy-3.5.6-trichloro-1.4-benzoquinone with one mol of 3-amino-N-ethylcarbazole in the presence of alcohol and of one equivalent of sodium acetate solution.

6. The process which comprises stirring at room temperature one mol of 2-methoxy-3.5.6-trichloro-1.4-benzoquinone with one mol of sodium 5-amino-2-hydroxybenzoate in the presence of alcohol and of one equivalent of sodium acetate solution.

7. The die intermediates of the general formula

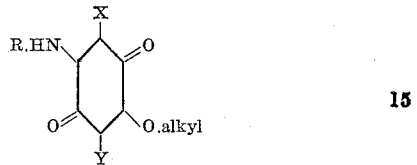

wherein X and Y represent members of the group consisting of hydrogen, chlorine and methyl and R represents a member of the group consisting of hydrogen, alkyl, diphenyl, carbazole, and auxochrome substituted phenyl groups.

8. The compound of the formula

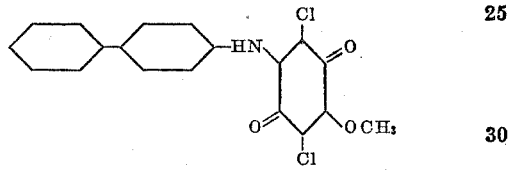

forming dark-violet leaflets which melt at 190° C. to 192° C.

9. The compound of the formula

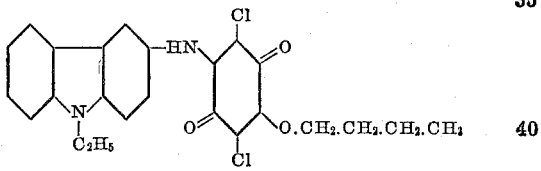

forming black-blue needles which melt at 185° C. to 186° C.

10. The compound of the formula

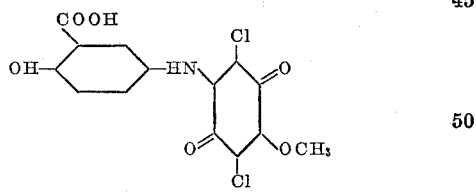

forming violet needles which melt at 254° C. to 256° C.

GERHARD LANGBEIN.